(12) United States Patent
Van Der Schaar

(10) Patent No.: US 6,944,222 B2
(45) Date of Patent: Sep. 13, 2005

(54) EFFICIENCY FGST FRAMEWORK EMPLOYING HIGHER QUALITY REFERENCE FRAMES

(75) Inventor: Mihaela Van Der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 466 days.

(21) Appl. No.: 10/090,863

(22) Filed: Mar. 4, 2002

(65) Prior Publication Data

US 2003/0165331 A1 Sep. 4, 2003

(51) Int. Cl.$^7$ .......................... H04N 7/12; H04N 11/02
(52) U.S. Cl. .......................... 375/240.12; 375/240.14
(58) Field of Search ................. 375/240.01, 240.15, 375/240.16, 240.27, 240.12, 240.14

(56) References Cited

U.S. PATENT DOCUMENTS

| | | | | |
|---|---|---|---|---|
| 6,580,754 B1 | * | 6/2003 | Wan et al. | 375/240.01 |
| 6,639,943 B1 | * | 10/2003 | Radha et al. | 375/240.11 |
| 6,700,933 B1 | * | 3/2004 | Wu et al. | 375/240.16 |
| 2003/0118096 A1 | * | 6/2003 | Ishtlaq et al. | 375/240.1 |

FOREIGN PATENT DOCUMENTS

WO    WO0205563    1/2002    ............ H04N/7/30

OTHER PUBLICATIONS

Motion–compensation fine–granular–scalability (MC–FGS) for wireless multimedia; van der Schaar, M.; Radha, H.; Multimedia Signal Processing, 2001 IEEE Fourth Workshop on Oct. 3–5, 2001 Page(s):453–458.*

Sun et al, 'Marcoblock–based Progressive Fine Granularity Scalable (PFGS) Video Coding with Flexible Temporal–SNR Scalabilities', Image Processing, 2001. Proceedings. 2001 International Conference on , vol.: 2 , Oct. 7–10, 2001, pp.: 1025–1028 vol. 2.*

"Macroblock–based Progressive Fine Granularity Scalable–Temporal (PFGST) Video Coding" by Sun et al, ISO/IEC JTC1/SC29/WG11, MPEG2001/6780, XP-001112949.

* cited by examiner

*Primary Examiner*—Chris Kelley
*Assistant Examiner*—Erick Rekstad

(57) ABSTRACT

A method and apparatus for coding video includes constructing motion-compensated extended base layer reference frames from base layer frames and at least portions of base layer residual image frames. The motion-compensated extended base layer reference frames are used for bi-directionally or uni-directionally predicting FGS motion-compensated residual image or temporal frames.

21 Claims, 6 Drawing Sheets

EFFICIENCY FGST FRAMEWORK EMPLOYING HIGHER QUALITY REFERENCE FRAMES

RELATED APPLICATIONS

Commonly-assigned, copending U.S. patent application Ser. No. 09/590,825, entitled "Hybrid Temporal-SNR Fine Granular Scalability Video Coding", filed Jun. 9, 2000.

Commonly-assigned, copending U.S. patent application Ser. No. 09/930,672 entitled "Totally Embedded FGS Video Coding With Motion Compensation", filed Aug. 15, 2001.

FIELD OF THE INVENTION

The present invention relates to fine granular scalability (FGS) video coding, and more particularly, to an FGS coding scheme where multiple layers of bi-directional and/or uni-directional predicted FGS temporal (FGST) frames are predicted from higher quality reference frames that include Base Layer information and at least a portion of Enhancement Layer information.

BACKGROUND OF THE INVENTION

Video streaming over Internet Protocol (IP) networks has enabled a wide range of multimedia applications. Internet video streaming provides real-time delivery and presentation of continuous media content while compensating for the lack of Quality-of-Service (QoS) guarantees over the Internet. Due to the variation and unpredictability of bandwidth and other performance parameters (e.g., packet loss rate) over IP networks, in general, most of the proposed streaming solutions are based on some type of a layered (or scalable) video coding scheme.

FIGS. 1A and 1B illustrate exemplary scalability structures 10A, 10B of one type of scalable video coding scheme known as hybrid temporal-SNR Fine Granular Scalability (FGS HS), as described in detail in earlier mentioned commonly assigned, copending U.S. patent application Ser. No. 09/590,825. Each FGS HS structure 10A, 10B includes a Base Layer 11A, 11B (BL) and an Enhancement Layer 12A, 12B (EL). The BL part of a scalable video stream represents, in general, the minimum amount of data needed for decoding that stream. The EL part of the stream represents additional information, i.e., FGS SNR frames or pictures and FGS temporal frames or pictures (denoted FGST), that enhances the video signal representation when decoded by the receiver. In particular, the additional temporal frames are introduced to obtain a higher frame-rate. The MPEG-4 FGS standard supports both the bi-directional predicted FGST picture type of FIG. 1A and the forward-predicted FGST picture type of FIG. 1B.

FIG. 2 illustrates the functional architecture of an exemplary FGS HS video encoder 100 as described in U.S. patent application Ser. No. 09/590,825. The encoding operation is based on a DCT transform, although other transforms (e.g. wavelet) can also be used. This video encoder 100 is capable of generating the FGS HS structures 10A, 10B of FIGS. 1A and 1B. The video encoder 100 comprises a BL encoder 110 and an EL encoder 130. The video encoder 100 receives an original video signal which is processed into a BL bit stream of I and P frames by the BL encoder 110 and into an EL bit stream of FGS SNR I and P frames and/or P and B FGST frames by the EL encoder 130.

In the FGS HS structures of FIGS. 1A and 1B, the FGST frames are predicted from low-quality base-layer reference frames stored in the frame memory block. Consequently, the resulting motion-compensated residual error is high, thus requiring a large number of bits for compressing these frames. Accordingly, the transition to a higher frame-rate is performed at either low bit-rates or very high bit-rates.

Accordingly, a technique is needed that lowers the bandwidth required for introducing FGST frames in a FGS HS video coding scheme.

SUMMARY OF THE INVENTION

A first aspect of the present invention is directed to video coding. The invention involves coding a video or video signal into a data-stream of base layer frames. Residual image frames are computed in a transform domain from the base layer frames. Extended base layer reference frames are constructed from the base layer frames and at least portions of the residual image frames and are motion-compensated to produce motion-compensated extended base layer reference frames. Motion-compensated residual image frames are predicted from the motion-compensated extended base layer reference frames and the video. The motion-compensated residual image frames are fine granular scalable coded into a data-stream of temporal frames.

A second aspect of the present invention is directed to video decoding. The invention involves decoding a base layer data-stream to construct base layer frames. An SNR quality frame portion of an enhancement layer data-stream is fine granular scalable decoded to construct SNR quality frames. Extended base layer reference frames are constructed from the base layer frames and at least portions of the SNR quality frames. The extended base layer reference frames are motion-compensated to produce motion-compensated extended base layer reference frames. A temporal frame portion of the enhancement layer data-stream is fine granular scalable decoded to construct motion-compensated residual frames, which are combined with the motion-compensated extended base layer reference frames to construct temporal frames.

BRIEF DESCRIPTION OF THE DRAWINGS

The advantages, nature, and various additional features of the invention will appear more fully upon consideration of the illustrative embodiments now to be described in detail in connection with accompanying drawings where like reference numerals identify like elements throughout the drawings.

DETAILED DESCRIPTION

Figure 3A:
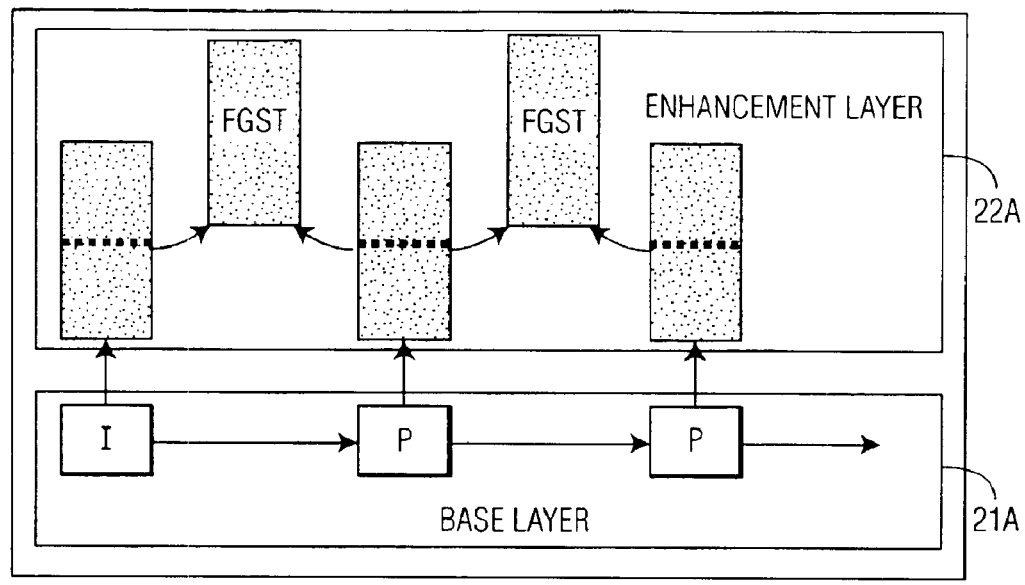
FIG. 3 is a diagram illustrating an FGS-based hybrid temporal-SNR scalability structure according to a first exemplary embodiment of the present invention.
FIG. 3B is a diagram illustrating an FGS-based hybrid temporal-SNR scalability structure according to a second exemplary embodiment of the present invention.

FIG. 3A illustrates an FGS-based hybrid temporal-SNR scalability structure (FGS HS structure 20A) according to a first exemplary embodiment of the present invention. The FGS HS structure 20A includes a BL 21A coded with I and P frames and a single EL 22A FGS coded with residual SNR I and P frames and motion-compensated residual or temporal (FGST) bi-directionally predicted (B) frames. It should be understood, that in other embodiments of the present invention, the FGST frames may be in their own "temporal" layer.

Figure 3B:
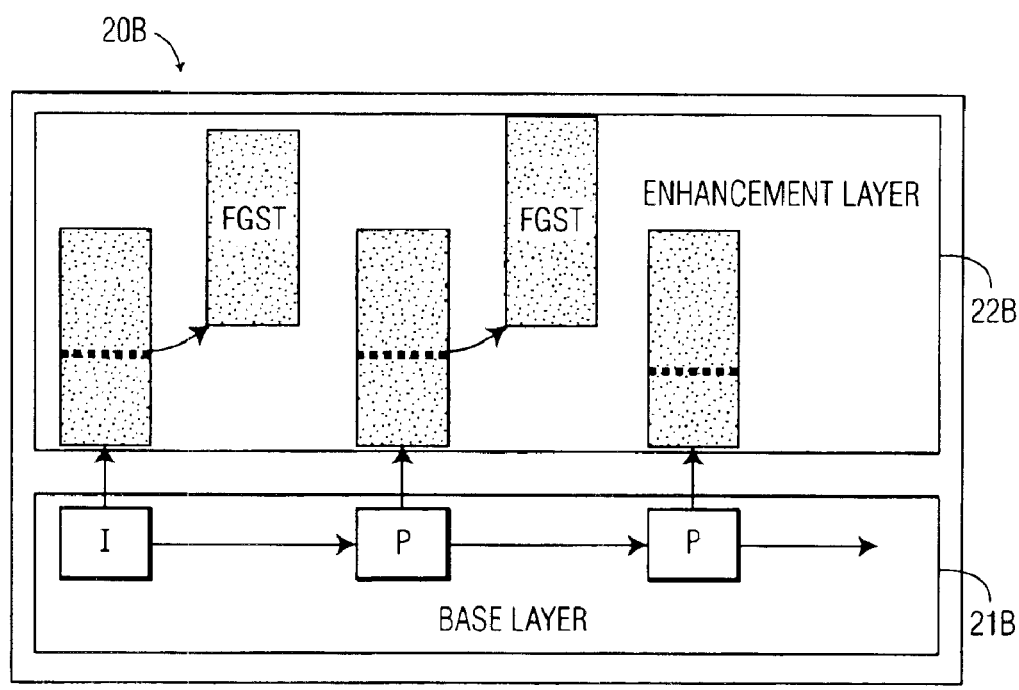

FIG. 3B illustrates an FGS hybrid temporal-SNR scalability structure (FGS HS structure 20B) according to a second exemplary embodiment of the present invention. The FGS HS structure 20B includes a BL 21B coded with I and P frames and a single EL 22B FGS coded with residual SNR I and P frames and motion-compensated or temporal (FGST) forwardly predicted (P) frames. As stated above, other embodiments of the present invention, the FGST frames may be in their own "temporal" layer.

Figure 1A:
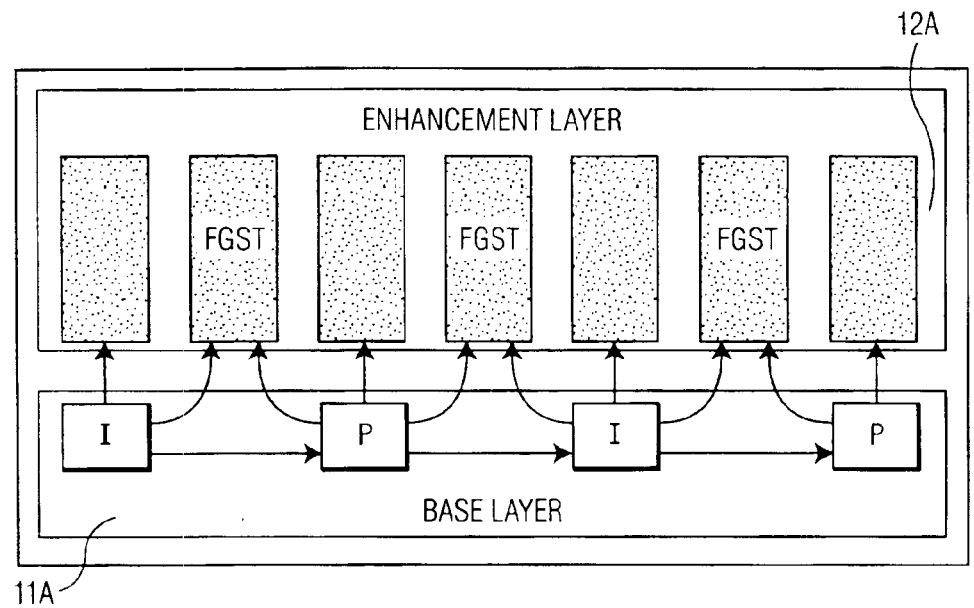
FIGS. 1A and 1B are diagrams illustrating exemplary scalability structures of a scalable video coding scheme known as hybrid temporal-SNR Fine Granular Scalability.
Figure 1B:
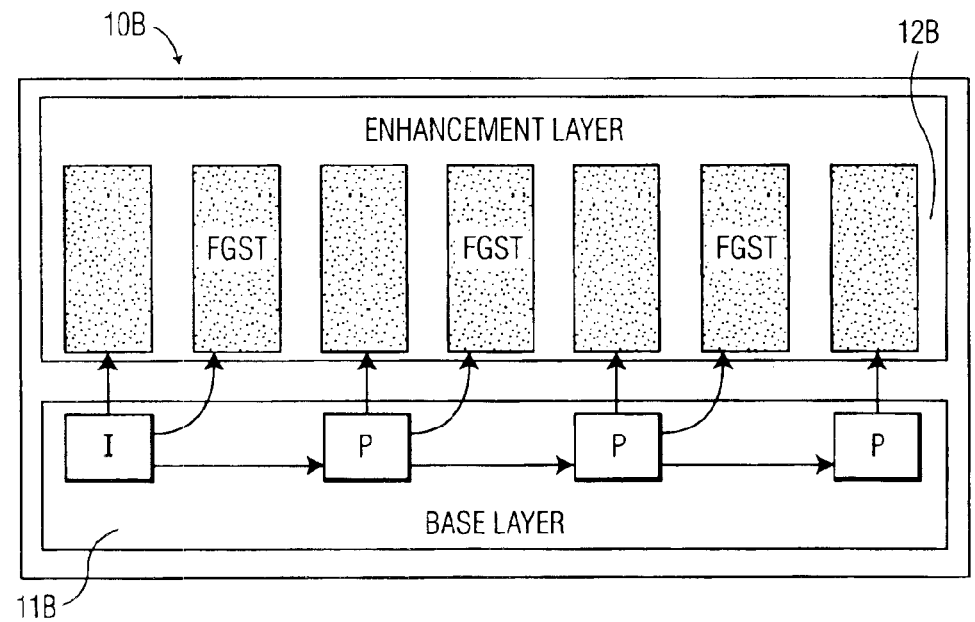
Figure 2:
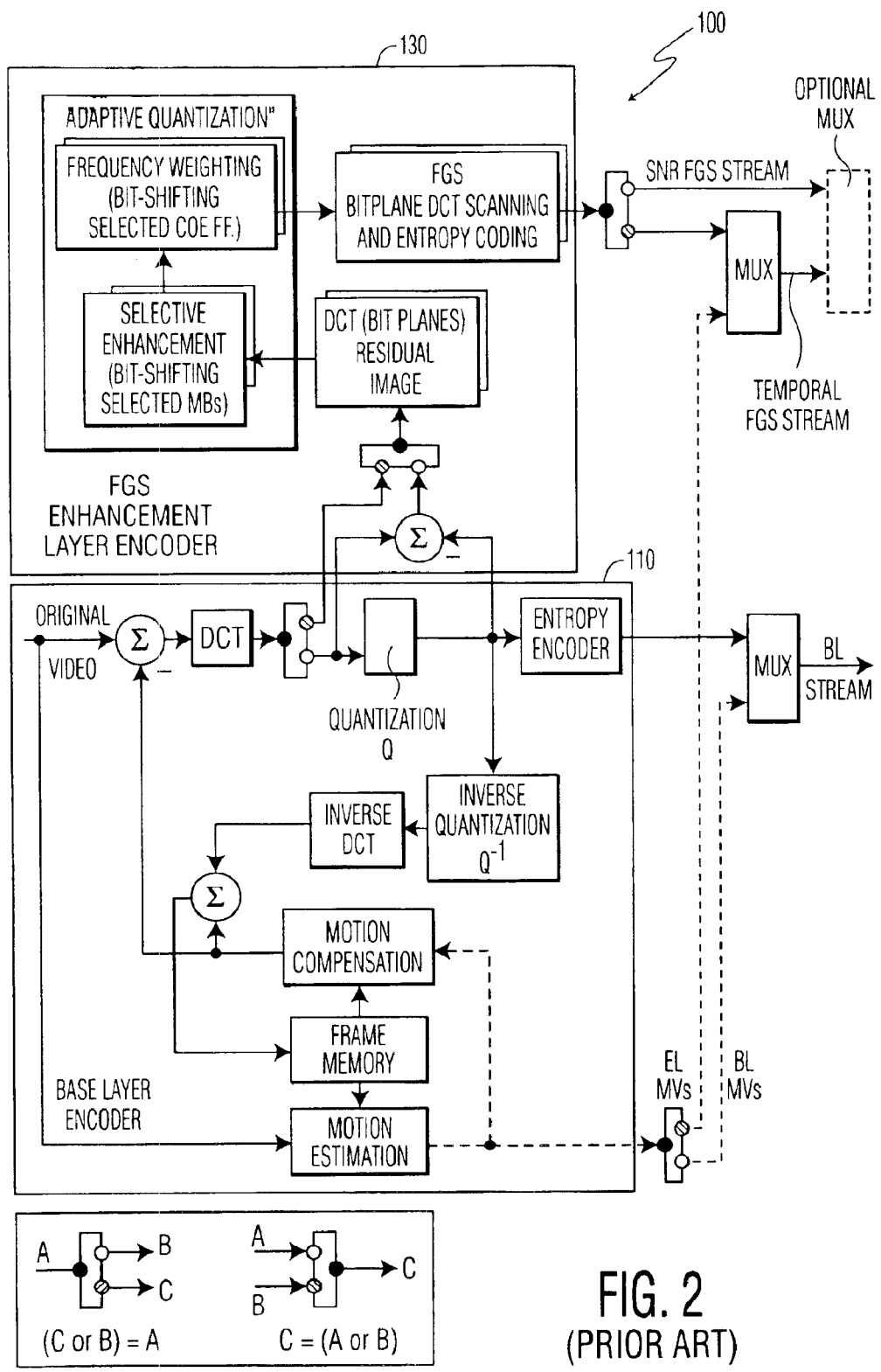
FIG. 2 is a diagram illustrating the functional architecture of an exemplary FGS hybrid temporal-SNR video encoder, which is capable of generating the scalability structures of FIGS. 1A and 1B.

Unlike the FGST frames of the FGS HS structures of FIGS. 1A and 1B, which are predicted from reference frames with only BL data, the FGST frames in the FGS HS structures of the present invention are predicted from higher quality "extended" reference frames that are each constructed from an entire BL frame and at least a portion of EL frame, i.e., one or more bit-planes or fractional bit-planes of the EL frame. Because these extended reference frames are of much higher quality, the residual motion-compensation error coded within the FGST frames is much lower than in the FGST frames of the FGS HS structures of FIGS. 1A and 1B. Hence, the FGST frames of the present invention can be more efficiently transmitted with fewer bits. The high coding efficiency of the present invention is especially useful for wireless applications, where a high coding efficiency gain is necessary.

Figure 4:
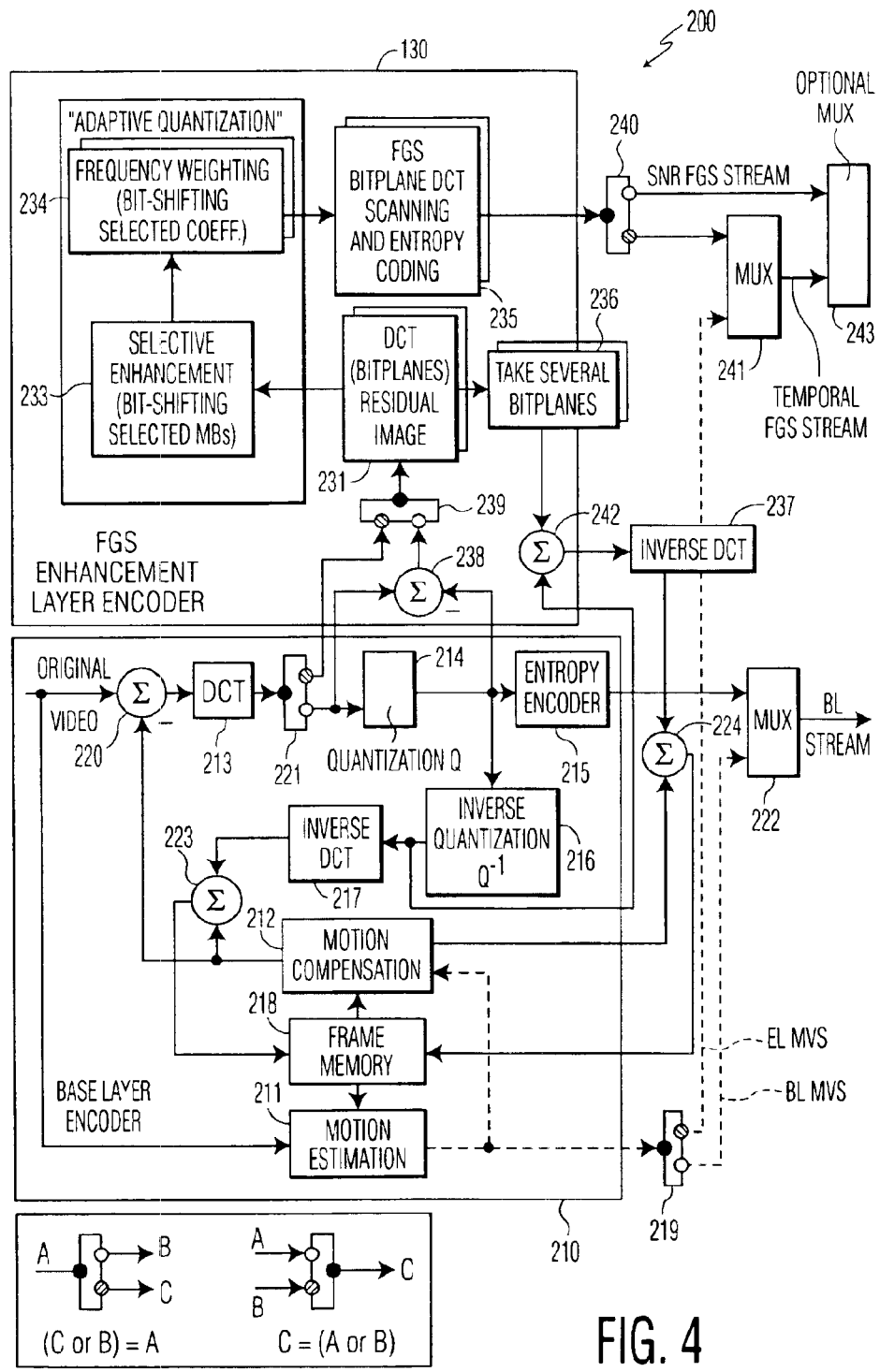
FIG. 4 is a diagram illustrating the functional architecture of an FGS hybrid temporal-SNR video encoder according to an exemplary embodiment of the present invention.

FIG. 4 illustrates the functional architecture of an FGS HS video encoder 200 according to an exemplary embodiment of the present invention. This video encoder 200 is capable of encoding a video signal in accordance with the FGS HS structures 20A, 20B of FIGS. 3A and 3B. The video encoder 200 comprises a BL encoder 210 and an EL encoder 230. The video encoder 200 receives an original video signal which is processed into a BL bit stream of I and P frames by the BL encoder 210 and into an EL bit stream of FGS SNR I and P frames and/or P and B FGST frames by the EL encoder 230. Although the encoder 200 of FIG. 4 is based on the discrete cosine transform, other transforms, such as wavelets, may be used.

The BL encoder 210 comprises a first video signal processing branch that includes a motion estimator 211, a motion compensator 212, a discrete cosine transform (DCT) 213, a quantizer 214, and an entropy encoder 215 that generates the BL bit stream. The BL encoder 210 further comprises a second video signal processing branch that includes an inverse quantizer 216, an inverse discrete cosine transform (IDCT) 217, and a frame memory 218.

The frame memory 218 is used for storing both standard BL reference frames and extended BL reference frames. The motion estimator 211 receives the original video signal and estimates the amount of motion between reference frames stored in the frame memory 218 and the video frames in the original video signal, as represented by changes in pixel characteristics, and generates motion information signals that contain BL motion vectors and prediction modes (BL reference frames) or EL motion vectors and prediction modes (extended BL reference frames). The motion information signals are applied to the motion compensator 212, and a first data-flow controller 219.

Standard BL references frame signals and the BL motion vector and prediction mode signals are utilized by the motion compensator 212 to generate motion-compensated reference frame signals that are used for predicting the standard BL P frames. The extended BL reference frame signals and the EL motion information signals for the FGST frames are utilized by the motion compensator 212 to generate motion-compensated extended BL reference frame signals that are used for predicting the FGST frames of the present invention.

A motion-compensated residual BL P frame signal is generated at a first subtractor 220 by subtracting the standard motion-compensated BL reference frame signal from the original video signal. Similarly, a motion-compensated residual FGST frame signal is generated at the first subtractor 220 by subtracting the motion-compensated extended BL reference frame signal from the original video signal.

The DCT 213 achieves compression by conventionally transforming the spatial information in the motion-compensated residual FGST and BL P frame signals into the frequency domain. BL I frames in the original video signal are also compressed in this manner by the DCT 213. At an appropriate time, a second data-flow controller 221 routes the BL I and P frame DCT bit-plane signals generated at the output of the DCT 213 to the quantizer 214 for further compression.

The entropy encoder 215 uses conventional variable length coding or like techniques to further compress the quantized DCT bit-plane signal at the output of the quantizer 214. A first multiplexer 222 multiplexes the signal at the output of the entropy encoder 215 with the BL motion information signal which is routed to the first multiplexer 222 from the motion estimator via the first data-flow controller 219 to generate the BL bit stream of I and P frames.

The inverse quantizer 216 de-quantizes the output of the quantizer 214 to produce a signal that represents the transform input to the quantizer 214. This signal represents the reconstructed BL DCT coefficients. The IDCT 217 decodes the reconstructed BL DCT coefficients to produce a signal which provides BL I and P frame representations of the original video signal as modified by the transform and quantization processes. A first adder 223 reconstructs the BL I and P frames from the signal at the output of the IDCT 217 and the appropriate reference frame signal at the output of the motion compensator 212. These reconstructed BL I and P frames are stored in the frame memory 218 and used as the standard BL reference frames for predicting other BL P frames and the FGST frames.

The EL encoder 230 comprises a first video signal processing branch that includes a DCT residual image memory 231, an adaptive quantizer 232, and an FGS encoder 235. The EL encoder 230 further comprises a second video signal processing branch that includes a bit-plane selector 236 and a second IDCT 237.

A second subtractor 238 in the EL encoder 230 subtracts the BL DCT bit-plane signal at the output of the DCT 213 from the quantized BL DCT bit-plane signal at the output of the quantizer 214 to generate SNR DCT bit-plane residual images. At an appropriate time, a third data-flow controller 239 applies the SNR DCT bit-plane residual image signal (SNR residual signal) at the output of the second subtractor 238, or the motion-compensated FGST DCT bit-plane residual signal (FGST residual signal) routed by the second data-flow controller 221, to the DCT residual image memory 231 for storage.

The adaptive quantizer 232 is a known coding tool that improves visual quality of the transform coded video. The adaptive quantizer 232 includes a known selective enhancement tool 233 that performs selective enhancement on the SNR and FGST residual signals by bit-shifting selected macroblocks within the residual image frames, and an optional known frequency weighting tool the bit-shifts selected coefficients.

SNR residual signals at the output of the adaptive quantizer 232 are compressed by the FGS coder 235 using bit-plane DCT scanning and entropy encoding, thereby generating an FGS SNR bit-stream. A fourth data-flow controller 240 sends the FGS SNR bit-stream at an appropriate time to a third multiplexer 243. FGST residual signals at the output of the adaptive quantizer 232 are also compressed by the FGS coder 235 using bit-plane DCT scanning and entropy encoding. The compressed FGST residual signals at the output of the FGS coder 235 are sent by the fourth data-flow controller 240 at an appropriate time to a second multiplexer 241, which multiplexes the EL motion information signal routed via the first data-flow controller 219 with the compressed FGST residual signals, thereby generating an FGST bit-stream. The SNR FGS EL bit-stream and the temporal FGS bit-stream can be either multiplexed via the third multiplexer 243 to generate a single EL bit-stream (which consists of both SNR and temporal FGS frames) or stored/transmitted in two separate streams.

The bit-plane selector or masking device 236 selects at least a portion of a bit-plane, i.e., a fractional bit-plane, one or more full bit-planes, or any combination of full and fractional bit-planes, of the SNR residual image signal. This data signal is combined with its corresponding BL frame signal at the output of the IDCT 216 of the BL encoder 210 at second adder 242 to construct an extended BL reference frame. The second IDCT 237 decodes the DCT coefficients of the extended BL reference frame. A third adder 223 combines the extended BL frame signal at the output of the second IDCT 237 and the appropriate reference frame signal at the output of the motion compensator 212. The extended BL frame constructed at the third adder 223 is stored in the frame memory 218 and used as the extended BL reference frame for predicting the FGST frames.

Figure 5:
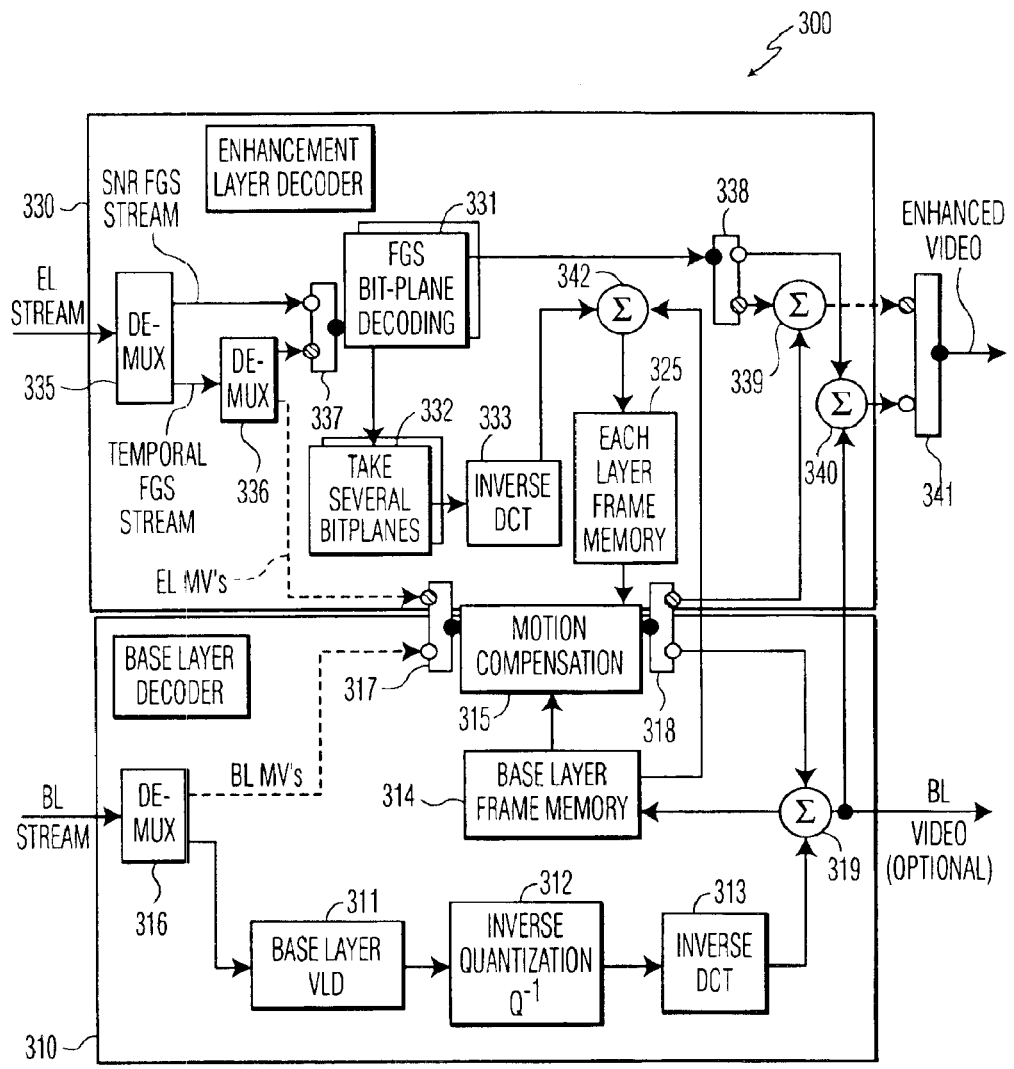
FIG. 5 is a diagram illustrating the functional architecture of an FGS hybrid temporal-SNR video decoder according to an exemplary embodiment of the present invention.

FIG. 5 illustrates the functional architecture of an FGS HS video decoder 300 according to an exemplary embodiment of the present invention. This video decoder 300 is capable of decoding the BL and EL bit-streams generated by the video encoder 200 of FIG. 4.

The video decoder 300 comprises a BL decoder 310 and an EL decoder 330. The BL decoder comprises a BL variable length decoder (VLD) 311, an inverse quantizer 311, and an IDCT 313, a BL frame memory 314 and a motion compensator 315.

The EL decoder 330 comprises an FGS bit-plane decoder 331, a bit-plane selector 332, a second IDCT 333 and an EL frame memory 334. The EL decoder 330 shares the motion compensator 315 with the BL decoder 310.

The BL bit-stream is received by the BL decoder 310 and demultiplexed, via a first demultiplexer 316 to separate the coded BL information signal from the BL motion information signal. The BL VLD 311 receives the BL information signal and reverses the entropy coding process from the BL encoder 210 to produce a quantized BL DCT coefficient signal. The quantized BL information signal is inverse quantized by the inverse quantizer 312 to reconstruct the BL DCT coefficient signal. The IDCT 313 inverse cosine transforms the BL DCT coefficient signal.

The motion compensator 315 receives the BL motion information signal at an appropriate time, as controlled by a first data-flow controller 317. The motion compensator 315 then uses the BL motion information and the BL reference frames stored in the BL frame memory 314 to reconstruct the motion-compensated BL reference frames that are used for predicting the BL P frames.

The motion-compensated BL reference frame signal at the output of the motion compensator 315 is applied to a first adder 319 at an appropriate time by the second data-flow controller 318. The first adder 319 combines this signal with the signal at the output of the IDCT 313 to reconstruct the BL I and P frames, which are stored in the BL frame memory. The BL frame signal generated at the output of the first adder 319 may be optionally outputted as a BL video.

The EL bit-stream is received by the EL decoder 330 and is demultiplexed by a second demultiplexer 335 to separate the coded FGS SNR signal from the coded FGST signal. The coded FGS SNR signal is inputted at an appropriate time, via a third data-flow controller 337 to the FGS bit-plane decoder 331 which decodes the bit-planes of the coded FGS SNR signal by performing variable length decoding, de-shifting and inverse discrete cosine transform operations. A second adder 340 combines the decoded FGS I and P SNR frame signal at the output of the FGS bit-plane decoder 331 with the decoded BL I and P frame signal at the output of the first adder 319 at an appropriate time via a fourth data-flow controller 338. A fifth data-flow controller 341, selects an appropriate time for outputting the combined BL and SNR frame signal at the output of the first adder 319 as an enhanced video.

The bit-plane selector 332 selects the previously selected number of bit-plane, fractional bit-planes or the like of partially decoded SNR residual image frame signal at the output of the FGS bit-plane decoder. The second IDCT 333 performs an inverse cosine transform on this selected SNR residual bit-plane signal to decode the SNR residual image or frame portions (or entire frames if the case may be) of the SNR portion of the extended BL reference frames. A third adder 342 combines the SNR frame portion at the output of the second IDCT 333 with its corresponding BL frame stored in the BL frame memory 314 to reconstruct the extended BL reference frames which are stored in the EL frame memory 334.

A third demultiplexer 336 demultiplexes the FGST information signal to separate the coded FGST frame signal from EL motion information signal. The coded FGST frame signal is received by the FGS bit-plane decoder at an appropriate time instance, via the third data-flow controller 337 and decoded. The EL motion information signal is received by the motion compensator 315 at an appropriate time instance, via the first data-flow controller 317. The motion compensator uses the EL motion information and the extended BL reference frames stored in the EL frame memory to reconstruct the motion-compensated extended BL reference frame signal. A fourth adder 339 combines the motion-compensated extended BL reference frame signal at the output of the motion compensator 315 with the decoded FGST frame signal at the output of the FGS decoder 331. The timing of this function is controlled by the fourth data-flow controller 338. The fifth data-flow controller 341, at an appropriate time, outputs the reconstructed FGST frame signal at the output of the fourth adder 339 as an enhanced video.

Figure 6:
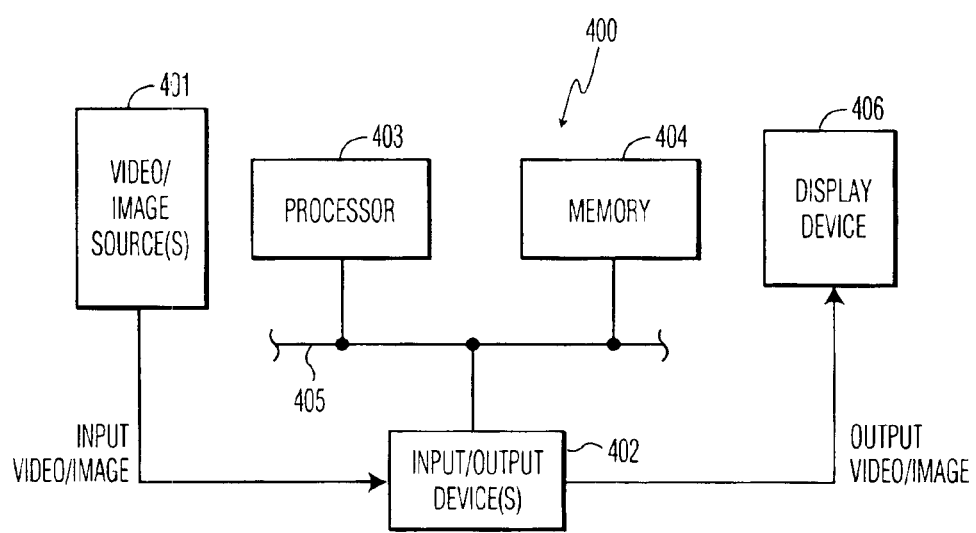
FIG. 6 illustrates an exemplary embodiment of a system which may be used for implementing the principles of the present invention.

FIG. 6 illustrates an exemplary embodiment of a system 400 which may be used for implementing the principles of the present invention. The system 400 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system 400 includes one or more video/image sources 401, one or more input/output devices 402, a processor 403 and a memory 404. The video/image source(s) 401 may represent, e.g., a television receiver, a VCR or other video/image storage device. The source(s) 401 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 402, processor 403 and memory 404 may communicate over a communication medium 405. The communication medium 405 may represent, e.g., a bus, a communication network, one or more internal connections of a circuit, circuit card or other device, as well as portions and combinations of these and other communication media. Input video data from the source(s) 401 is processed in accordance with one or more software programs stored in memory 404 and executed by processor 403 in order to generate output video/images supplied to a display device 406.

In a preferred embodiment, the coding and decoding employing the principles of the present invention may be implemented by computer readable code executed by the system. The code may be stored in the memory 404 or read/downloaded from a memory medium such as a CD-ROM or floppy disk. In other embodiments, hardware circuitry may be used in place of, or in combination with, software instructions to implement the invention. For example, the functional elements shown in FIGS. 4 and 5 may also be implemented as discrete hardware elements.

While the present invention has been described above in terms of specific embodiments, it is to be understood that the invention is not intended to be confined or limited to the embodiments disclosed herein. For example, other transforms besides DCT can be employed, including but not limited to wavelets or matching-pursuits. These and all other such modifications and changes are considered to be within the scope of the appended claims.

What is claimed is:

1. A method of coding video, comprising the steps of:
   coding the video into a data-stream of base layer frames;
   computing residual image frames in a transform domain from the base layer frames;
   coding the residual image frames into a data-stream of SNR quality frames;
   constructing extended base layer reference frames, each of the extended base layer reference frames constructed from one of the base layer frames and at least a portion of one of the SNR quality frames;
   motion-compensating the extended base layer reference frames to produce motion-compensated extended base layer reference frames;
   predicting motion-compensated residual image frames from the motion-compensated extended base layer reference frames and the video; and
   fine granular scalable coding the motion-compensated residual image frames into a data-stream of temporal frames.

2. The method of coding video according to claim 1, wherein the data-stream of SNR quality frames are fine granular scalable coded.

3. The method of coding video according to claim 2, further comprising the step of combining the data-stream of temporal frames with the data-stream of SNR quality frames to construct a single data-stream of the temporal and SNR quality frames.

4. A method of coding a video signal, comprising the steps of:
   coding the video signal into a data-stream of base layer frames;
   computing residual image frames in a transform domain from the base layer frames;
   coding the residual image frames into a data-stream of SNR quality frames;
   constructing extended base layer reference frames, each of the extended base layer reference frames constructed from one of the base layer frames and at least a portion of one of the SNR quality frames;
   motion-compensating the extended base layer reference frames to produce motion-compensated extended base layer reference frames;
   predicting motion-compensated residual image frames from the motion-compensated extended base layer reference frames and the video signal; and
   fine granular scalable coding the motion-compensated residual image frames into a data-stream of temporal frames.

5. The method of coding a video signal according to claim 4, wherein the data-stream of SNR quality frames are fine granular scalable coded.

6. The method of coding a video signal according to claim 5, further comprising the step of combining the data-stream of temporal frames with the data-stream of SNR quality frames to construct a single data-stream of the temporal and SNR quality frames.

7. An apparatus for coding video, comprising:
   means for coding the video into a data-stream of base layer frames;
   means for computing residual image frames in a transform domain from the base layer frames;
   means for coding the residual image frames into a data-stream of SNR quality frames;
   means for constructing extended base layer reference frames, each of the extended base layer reference frames constructed from one of the base layer frames and at least a portion of one of the SNR quality frames;
   means for motion-compensating the extended base layer reference frames to produce motion-compensated extended base layer reference frames;
   means for predicting motion-compensated residual image frames from the motion-compensated extended base layer reference frames and the video; and
   means for fine granular scalable coding the motion-compensated residual image frames into a data-stream of temporal frames.

8. The apparatus according to claim 7, wherein the means for coding the residual image frames into a data-stream of SNR quality frames utilizes fine granular scalable coding.

9. The apparatus according to claim 8, further comprising means for combining the data-stream of the temporal frames with the data-stream of the SNR quality frames to construct a single data-stream of the temporal and SNR quality frames.

10. A memory medium for coding video, comprising:
   code for coding the video into a data-stream of base layer frames;
   code for computing residual image frames in a transform domain from the base layer frames;
   code for fine granular scalable coding the residual image frames into a data-stream of SNR quality frames;
   code for constructing extended base layer reference frames, each of the extended base layer reference frames constructed from one of the base layer frames and at least a portion of one of the SNR quality frames;
   code for motion-compensating the extended base layer reference frames to produce motion-compensated extended base layer reference frames;
   code for predicting motion-compensated residual image frames from the motion-compensated extended base layer reference frames and the video; and
   code for fine granular scalable coding the motion-compensated residual image frames into a data-stream of temporal frames.

11. The memory medium according to claim 10, wherein the code for coding the residual image frames into a data-stream of SNR quality frames utilizes fine granular scalable coding.

12. The memory medium according to claim 11, further comprising code for combining the data-stream of the temporal frames with the data-stream of the SNR quality frames to construct a single data-stream of the temporal and SNR quality frames.

13. A method of decoding a base layer data-stream and an enhancement layer data-stream, which collectively represent a video, comprising the steps of:
   decoding the base layer data-stream to construct base layer frames;
   fine granular scalable decoding an SNR quality frame portion of the enhancement layer data-stream to construct SNR quality frames;
   constructing extended base layer reference frames, each of the extended base layer reference frames constructed from one of the base layer frames and at least a portion of one of the SNR quality frames;
   motion-compensating the extended base layer reference frames to produce motion-compensated extended base layer reference frames;
   fine granular scalable decoding a temporal frame portion of the enhancement layer data-stream to construct motion-compensated residual frames;
   combining the motion-compensated extended base layer reference frames with the motion-compensated residual frames to construct temporal frames.

14. The method according to claim 13, further comprising the step of combining the base layer frames and the SNR quality frames into an enhanced video.

15. The method according to claim 13, further comprising the step of combining the base layer frames, the SNR quality frames, and the temporal frames into an enhanced video.

16. An apparatus for decoding a base layer data-stream and an enhancement layer data-stream, which collectively represent a video, comprising:
   means for decoding the base layer data-stream to construct base layer frames;
   means for fine granular scalable decoding an SNR quality frame portion of the enhancement layer data-stream to construct SNR quality frames;
   means for constructing extended base layer reference frames, each of the extended base layer reference frames constructed from one of the base layer frames and at least a portion of one of the SNR quality frames;
   means for motion-compensating the extended base layer reference frames to produce motion-compensated extended base layer reference frames;
   means for fine granular scalable decoding a temporal frame portion of the enhancement layer data-stream to construct motion-compensated residual frames;
   means for combining the motion-compensated extended base layer reference frames with the motion-compensated residual frames to construct temporal frames.

17. The apparatus according to claim 16, further comprising means for combining the base layer frames and the SNR quality frames into an enhanced video.

18. The apparatus according to claim 16, further comprising means for combining the base layer frames, the SNR quality frames, and the temporal frames into an enhanced video.

19. A memory medium for decoding a base layer data-stream and an enhancement layer data-stream, which collectively represent a video, comprising:
   code for decoding the base layer data-stream to construct base layer frames;
   code for fine granular scalable decoding an SNR quality frame portion of the enhancement layer data-stream to construct SNR quality frames;
   code for constructing extended base layer reference frames, each of the extended base layer reference frames constructed from one of the base layer frames and at least a portion of one of the SNR quality frames;
   code for motion-compensating the extended base layer reference frames to produce motion-compensated extended base layer reference frames;
   code for fine granular scalable decoding a temporal frame portion of the enhancement layer data-stream to construct motion-compensated residual frames;
   code for combining the motion-compensated extended base layer reference frames with the motion-compensated residual frames to construct temporal frames.

20. The memory medium according to claim 19, further comprising code for combining the base layer frames and the SNR quality frames into an enhanced video.

21. The memory medium according to claim 19, further comprising code for combining the base layer frames, the SNR quality frames, and the temporal frames into an enhanced video.

* * * * *